United States Patent
Matveev

(10) Patent No.: US 11,258,945 B2
(45) Date of Patent: Feb. 22, 2022

(54) INTERACTIVE DATA VISUALIZATION ENVIRONMENT

(71) Applicant: MAX-PLANCK-GESELLSCHAFT ZUR FÖRDERUNG D. WISSENSCHAFTEN E.V., Munich (DE)

(72) Inventor: Alexei Matveev, Kassel (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 16/294,832

(22) Filed: Mar. 6, 2019

(65) Prior Publication Data

US 2019/0273863 A1 Sep. 5, 2019

Related U.S. Application Data

(63) Continuation of application No. PCT/EP2017/062760, filed on May 26, 2017.

(30) Foreign Application Priority Data

Sep. 16, 2016 (EP) .................................... 16002023

(51) Int. Cl.
*H04N 5/232* (2006.01)
*G03B 21/02* (2006.01)
(Continued)

(52) U.S. Cl.
CPC ......... *H04N 5/23238* (2013.01); *G03B 21/02* (2013.01); *G03B 21/56* (2013.01); *G03B 21/62* (2013.01); *G03B 35/20* (2013.01); *G06F 16/40* (2019.01); *G09F 19/18* (2013.01); *H04N 5/23206* (2013.01); *H04N 9/3147* (2013.01); *H04N 9/3185* (2013.01)

(58) Field of Classification Search
CPC ............ H04N 5/23238; H04N 9/3185; H04N 5/23206; H04N 9/3147; G03B 35/20; G03B 21/62; G03B 21/02; G03B 21/56; G09F 19/18; G06F 16/40
See application file for complete search history.

(56) References Cited

U.S. PATENT DOCUMENTS 6,669,346 B2 12/2003 Metcalf
6,968,973 B2 11/2005 Uyttendaele et al.
(Continued)

FOREIGN PATENT DOCUMENTS

GB 2517069 A 2/2015

OTHER PUBLICATIONS

Araceli Perez Ramos: "NCTech 360 & Virtual Tour", Mar. 4, 2016 (Mar. 4, 2016), XP055443222, URL: http://www.laserscanning-europe.com/de/system/files/redakteur_images/VirtualTours.pdf (Year: 2016).*

(Continued)

*Primary Examiner* — James M Pontius
*Assistant Examiner* — Tyler B Edwards
(74) *Attorney, Agent, or Firm* — Siritzky Law, PLLC

(57) ABSTRACT

An immersive environment for data exploration comprising a curved video projection surface. According to the invention, the curved video projection surface is assembled from a multitude of video projection modules.

10 Claims, 13 Drawing Sheets

(51) Int. Cl.
  *H04N 9/31* (2006.01)
  *G03B 21/56* (2006.01)
  *G03B 35/20* (2021.01)
  *G09F 19/18* (2006.01)
  *G06F 16/40* (2019.01)
  *G03B 21/62* (2014.01)

(56) References Cited

U.S. PATENT DOCUMENTS

| | | | |
|---|---|---|---|
| 9,084,047 B2 | 7/2015 | O'Polka | |
| 9,772,549 B2 | 9/2017 | Candry et al. | |
| 2001/0040671 A1* | 11/2001 | Metcalf | G03B 37/04 353/94 |
| 2004/0239699 A1* | 12/2004 | Uyttendaele | G06F 16/748 715/716 |
| 2006/0190285 A1 | 8/2006 | Harris et al. | |
| 2014/0270320 A1* | 9/2014 | O'Polka | G10K 11/20 381/386 |
| 2016/0088272 A1* | 3/2016 | Candry | G02B 5/3041 353/15 |

OTHER PUBLICATIONS

WIPO, International Search Report dated Feb. 19, 2018 in International Appln. No. PCT/EP2017/062760, (7.p).

WIPO, Written Opinion dated Feb. 19, 2018 in International Appln. No. PCT/EP2017/062760, (19.p).

Araceli Perez Ramos, "NCTech 360 & Virtual Tour," 2016, XP055443222, pp. 1-7, URL:http://www.laserscanning-europe.com/de/system/files/redakteur_images/VirtualTours.pdf.

Digital Photography Review, "Make your own Google Street View Virtual Tours," 2013, XP055442811, pp. 1-8, URL:https://www.dpreview.com/news/6192101318/google-street-view-virtual-tour-photo-sphere.

Anonymous, "Curve the Distinctive Screen," 2013, XP055443933, pp. 1-5, URL:https://avstumpfl.com/fileadmin/user_upload/downloads/en/product_information/Curve_Brochure.pdf.

Anonymous, "360 Degree Projection Screen," 2016, XP055443103, pp. 1-10, URL:https://web.archive.org/web/20160814184543/http://pixelwix.com/home/29-360-degree-projection-screens.html.

360 Rumours, "Create Virtual Tours and Add Interactivity to your 360 Photos with These Tools—360 Rumors," 2016, XP055442763, pp. 1-4, URL:http://360rumors.com/2016/09/create-virtual-tours-and-add.html.

Sajadi B et al., "Autocalibration of Multiprojector CAVE-Like Immersive Environments," IEEE Transactions on Visualization and Computer Graphics, vol. 18, No. 3, 2012, XP011408955, pp. 381-393.

WIPO, International Preliminary Report dated Mar. 19, 2019 in International Appln. No. PCT/EP2017/062760, (20.p).

China National Intellectual Property Administration, Application No. 201780065422.9, Office Action, dated Sep. 21, 2020.

\* cited by examiner

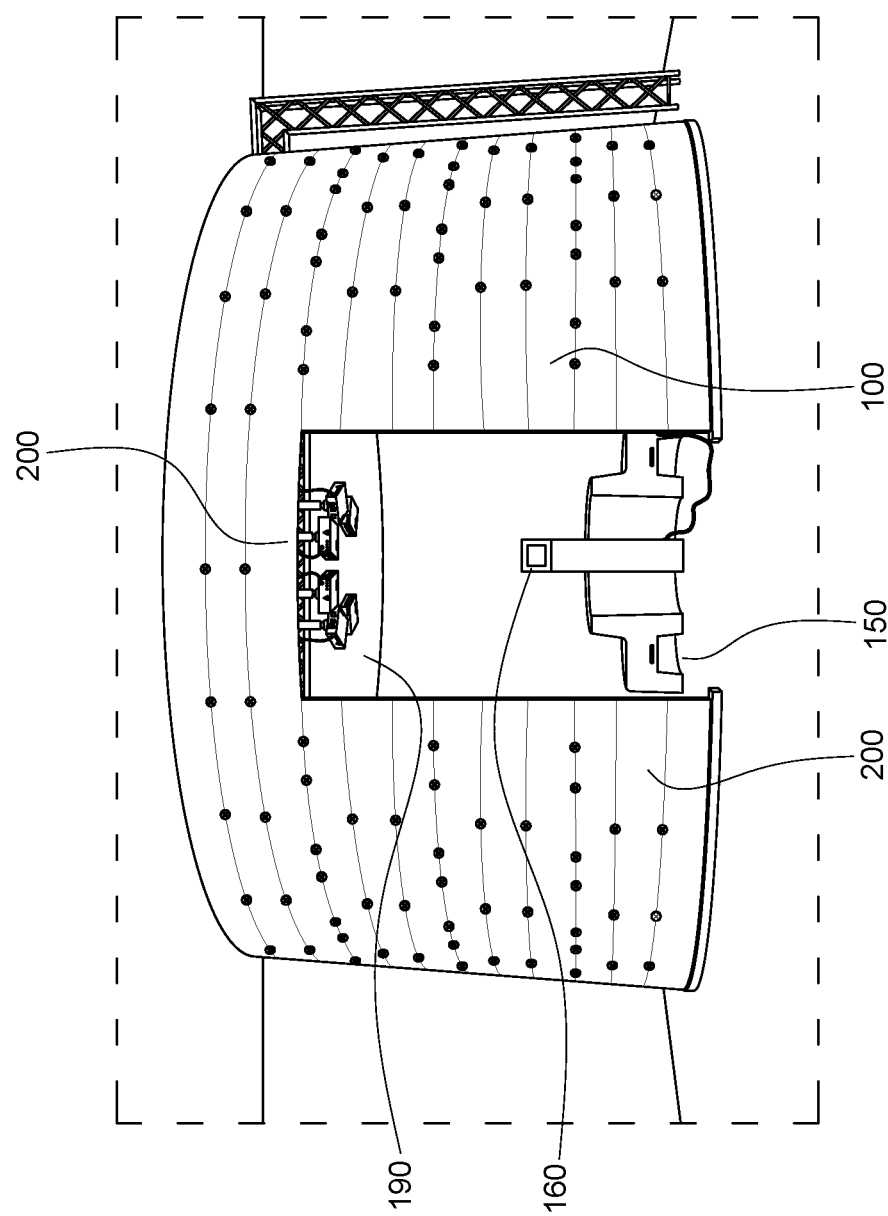

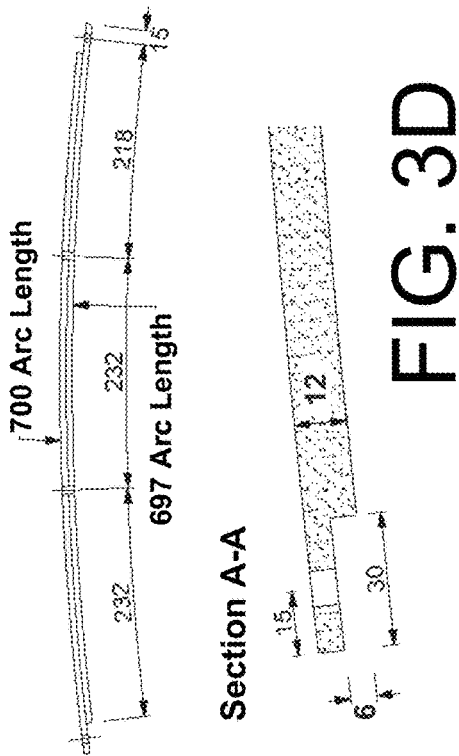
FIG. 3C
FIG. 3D
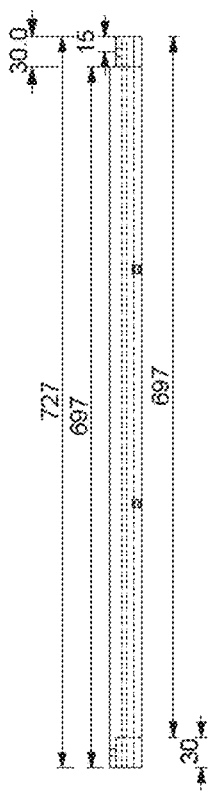
FIG. 3A
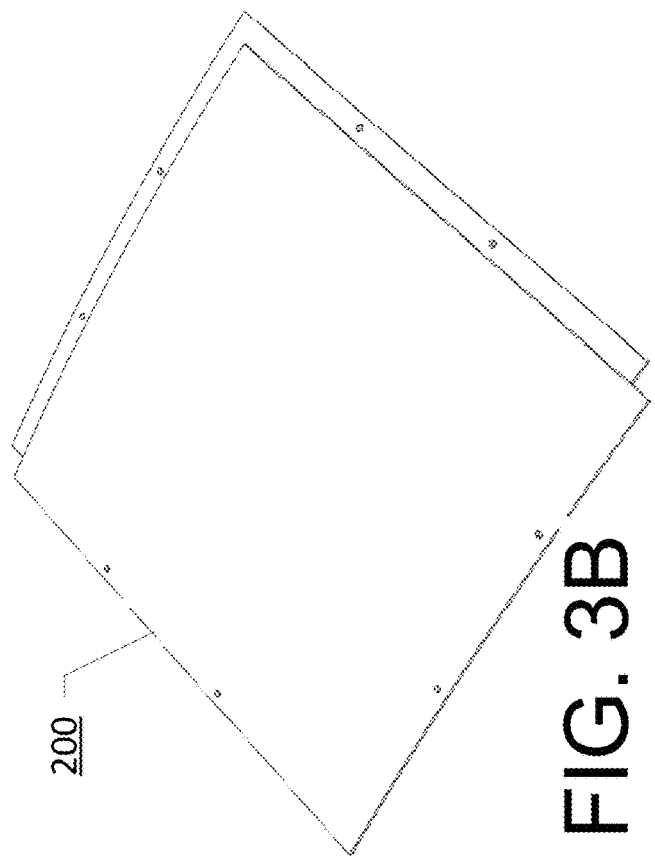
FIG. 3B

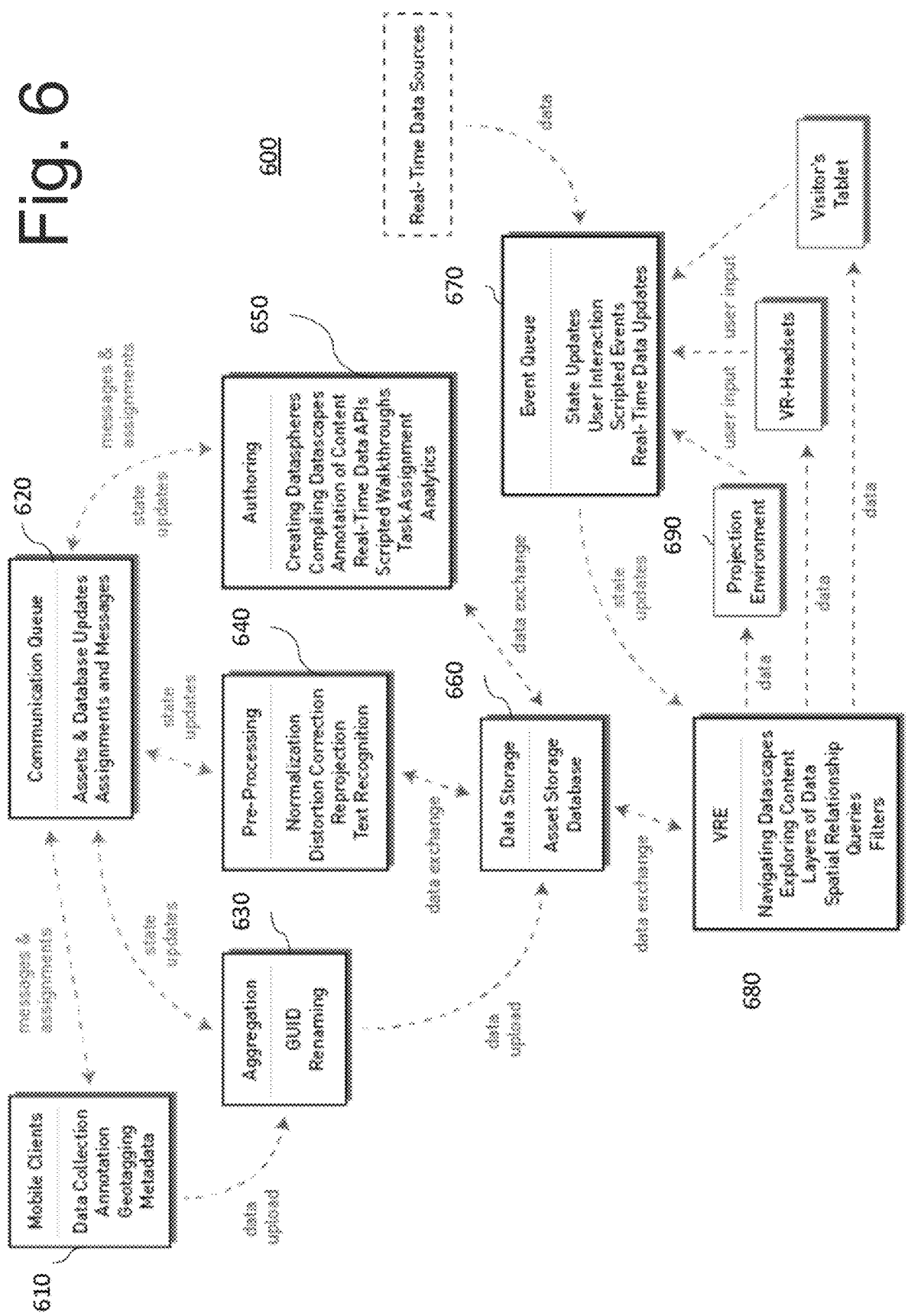

INTERACTIVE DATA VISUALIZATION ENVIRONMENT

RELATED APPLICATIONS

This application is a continuation of PCT/EP2017/062760, filed May 26, 2017, the entire contents of which are hereby fully incorporated herein by reference for all purposes. PCT/EP2017/062760 claims priority from European patent application no. 16 002 023.6, filed Sep. 16, 2016, the entire contents of which are hereby fully incorporated herein by reference for all purposes.

BACKGROUND

Scientists working with visual data face numerous limitations arising from the restricted scope and functions of conventional monitors, projectors and software applications.

For scientists who rely on visual data or data visualizations, the limitations inherent to monitors, multiple display spans or projection facilities can present serious constraints for data gathering, analysis and presentation of findings. With conventional projections and software, visual data and data visualizations: can be difficult to acquire and use in field situations; are not easy to index, segment and compare—particularly across formats; can be difficult to document and annotate; and they can be difficult to integrate with other material like field notes, videos, real-time data sources, internet resources and printed materials.

Current technology and developments in the field focus on immersive presentations of static, linear narratives, limiting the possibilities of interaction and collaboration. What is needed are analytical and collaborative capacities beyond a presentation-oriented approach according to the state of the art. Further, technological barriers in respect to authoring immersive content need to be lowered, in order to offer researchers new capabilities to organize, analyze and present their research.

OBJECT OF THE INVENTION

It is therefore an object of the invention to provide an interactive data visualization environment and related methods for interactive data gathering, authoring and visualization, which provide an intuitive and easy access to audiovisual data, including text, symbols, images, videos with complex interrelations.

SUMMARY

This object is achieved by the interactive data visualization environment and the related methods according to the independent claims. Advantageous embodiments are defined in the dependent claims.

In summary, the invention allows the creation, collection and annotation of data; the augmentation of collected data with geographic signatures; the efficient storage of collected and annotated data. In a further aspect, it allows the management of collected data and organizing data collection efforts of remote teams in real-time; commenting on progress of data collection and highlighting geographical areas of interest for further research; grouping audiovisual, textual and other data into interactive, navigable clusters, relevant for or related to a specific geographical location; arranging clusters of geo-located information into multiple layers, based on type of data or temporal or semantic grouping; superimposing multiple layers of data on the inner surface of a virtual sphere, against a panoramic audiovisual backdrop of an existing location or a computer-generated landscape; putting multiple virtual spheres into spatial relationship to each other, connecting and compiling them into so-called datascapes, worlds interactively traversable in an arbitrary, non-linear way. In a further aspect, the invention allows presenting interactive, navigable datascapes by means of immersive projection environments (IPEs) and virtual-reality head-mounted devices (VR-HMDs); recreating existing and simulating hypothetical environments; navigating and interacting with datascapes, selecting, filtering and annotating data points by means of gestural and voice user interface; amplification of certain segments of panoramic visual or aural data based on spatial orientation of the user and gestural input, and the dissemination of datascapes and parts thereof to a variety of devices.

BRIEF DESCRIPTION OF THE FIGURES

These and further aspects of the present invention will be more readily understood when studying the following detailed description of various embodiments of the invention, in connection with the annexed drawing, in which:

FIG. 2 is an outside view of a prototype build by the inventors of the interactive data visualization environment according to the embodiment of the invention.

FIGS. 3A-3E are technical drawings of a video projection surface module used in the construction of the video projection surface in the embodiment shown in FIG. 2.

FIG. 6 shows a schematic overview of the software components and their interaction in an interactive data visualization environment according to an embodiment of the invention.

FIG. 12b shows an edge-blending mask for luminosity adjustment between individual projection devices corresponding to an edge blending function of FIG. 12a.

DETAILED EMBODIMENTS

In order to achieve the aforementioned functionality, the invention relies on a set of hardware components and a stack of software applications and tools.

Figure 1A:
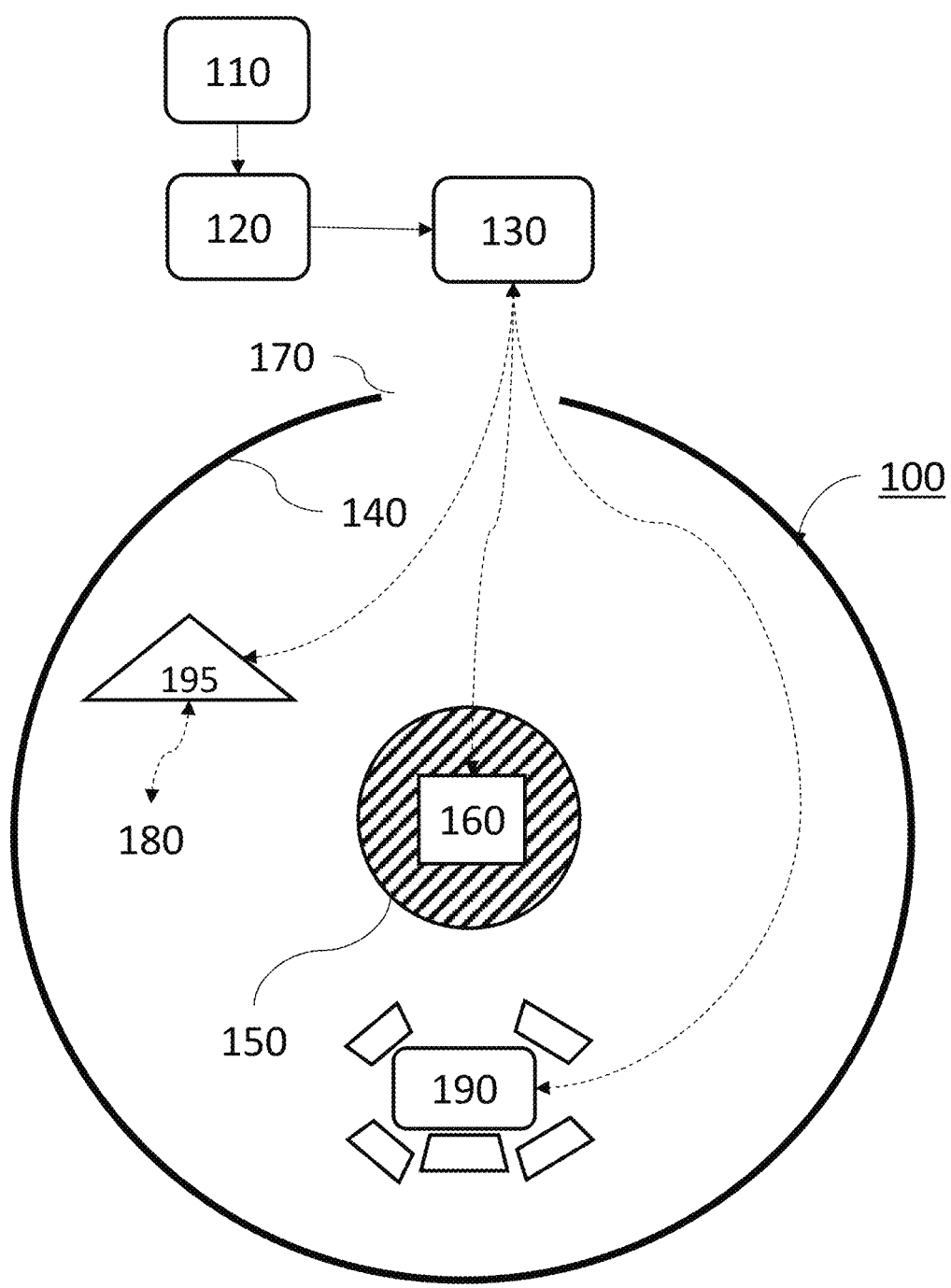
FIG. 1a is a schematic layout of a hardware configuration of an interactive data visualization environment according to an embodiment of the invention.

FIG. 1a is a schematic block diagram of a hardware configuration of an interactive data visualization environment according to an embodiment of the invention.

More particularly, the environment comprises clients 110, e.g. a variety of mobile computers with integrated photo and video camera as well as a microphone and a GPS-receiver module for data collection, annotation and augmentation. The clients connect to a data storage component 120, which may include a variety of computing devices for automated aggregation, pre-processing and storage of collected data. The storage component 120 is connected to an application server 130 for managing the stored data and authoring datascapes.

The interactive data visualization environment further includes an immersive projection environment 100, or IPE, comprised of a video projection unit 190, a video projection screen 140, an audio projection unit (not shown), an operator console 160 located at the center of the IPE's base, a gesture recognition device (not shown), a speech recognition device (not shown), a 3D navigation controller (not shown), a media server (not shown), a touch-sensitive auxiliary display, a wireless network access point 195 and a bench 150.

Further, users may bring a variety of visitor clients 180, e.g. smartphones or tablet computers that also connect to the wireless network access point 195.

Figure 1B:
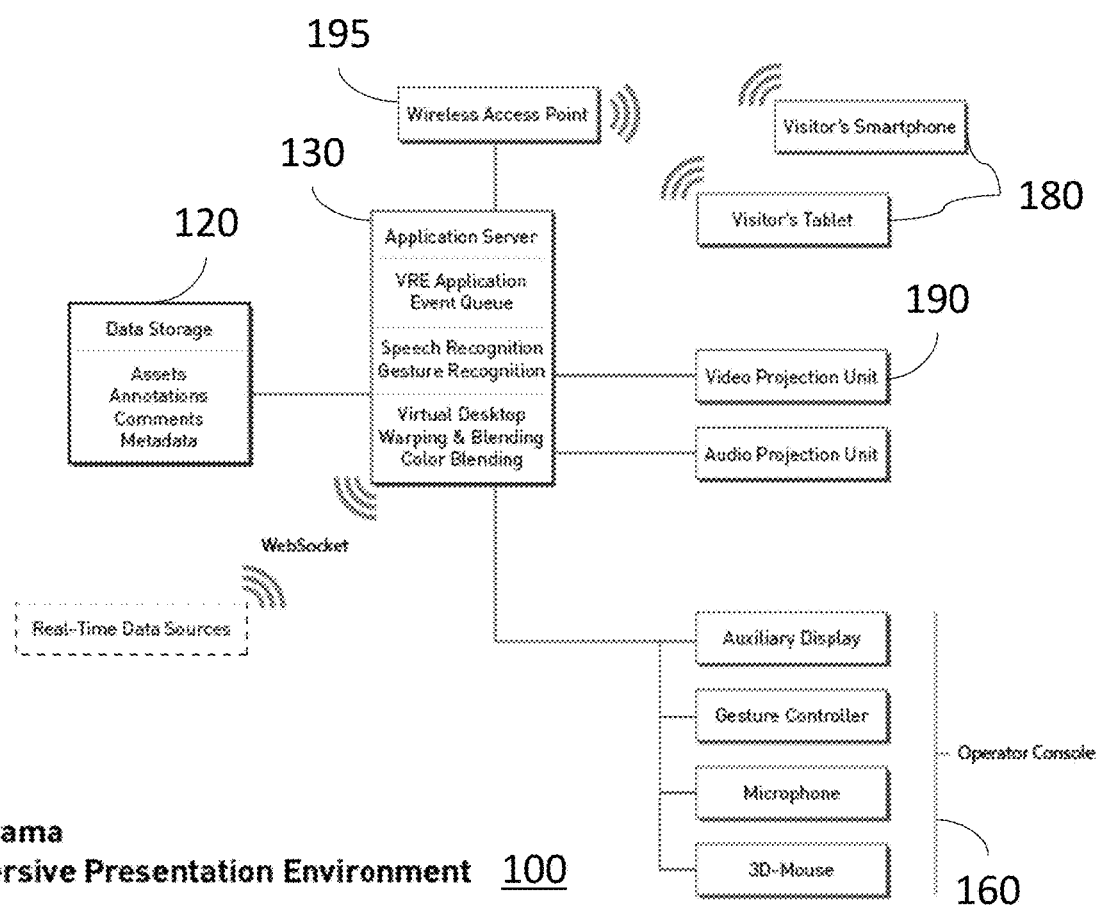
FIG. 1b is a more detailed block diagram of the components and their interaction of the interactive data visualization environment according to the embodiment of the invention.
Figure 3E:
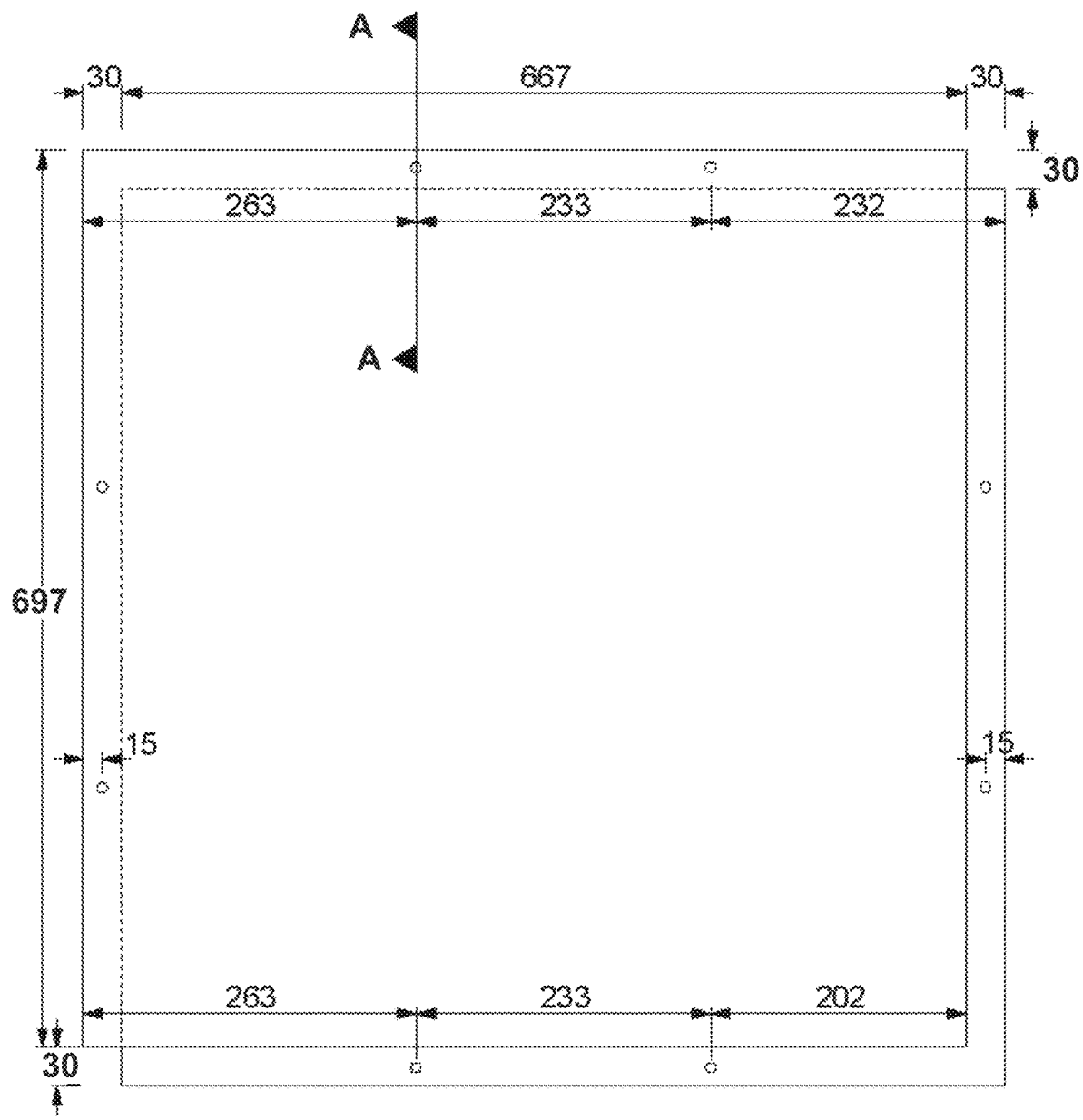

FIG. 1b is a more detailed schematic overview of the components and their interaction of the interactive data visualization environment according to the embodiment of the invention.

In order to display the authored interactive presentations a display system allowing the user to be immersed in the scene is provided, using a virtual spherical projection surface presented with the help of a virtual reality head-mounted display (VR-HMD) or a physical immersive projection environment.

FIG. 2 is an outside view of a prototype build by the inventors of a physical immersive projection environment according to an embodiment of the invention. The IPE enables the interactive data visualization environment to project an immersive, interactive datascape and present the data collected at diverse locations as a set of navigable, interconnected, multilayered spheres to a number of visitors inside the projection screen.

FIGS. 3A-3E are technical drawings of a video projection surface module 200 used in the construction of the video projection surface in the embodiment shown in FIG. 2a. The projection surface has the form of an upright, open cylinder and is constructed as a grid of 12 mm thick, thermoformed DuPont Corian modules. DuPont Corian is a solid, homogeneous surfacing material, composed of ≈⅓ acrylic resin (also known as polymethyl methacrylate or PMMA), and ≈⅔ natural minerals.

Use of DuPont Corian as a material allows the structure to be self-supporting and due to partial translucency of the modules, the projected imagery as well as silhouettes of the visitors inside the cylinder are observable from the outside. Another benefit of the material choice is the possibility to convert a temporal installation into a permanent one, eliminating seams between modules with the help of a joint adhesive, resulting in a uniform surface after cure.

Figure 4A:
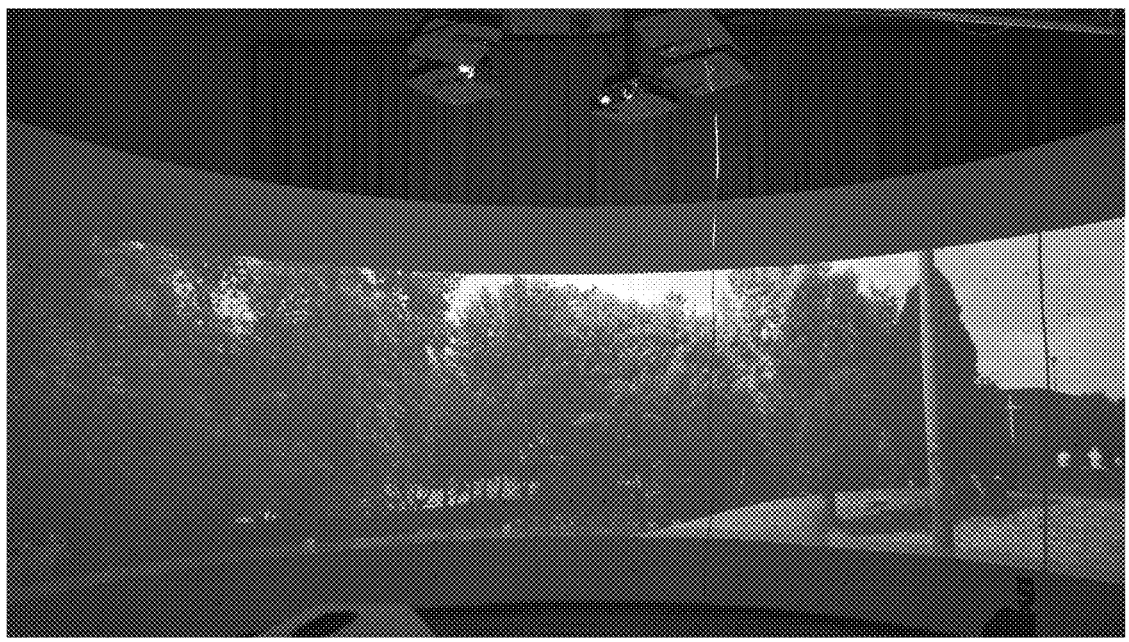
FIG. 4a shows a projection of an image on the video projection surface on the inside of the immersive projection environment.
Figure 4B:
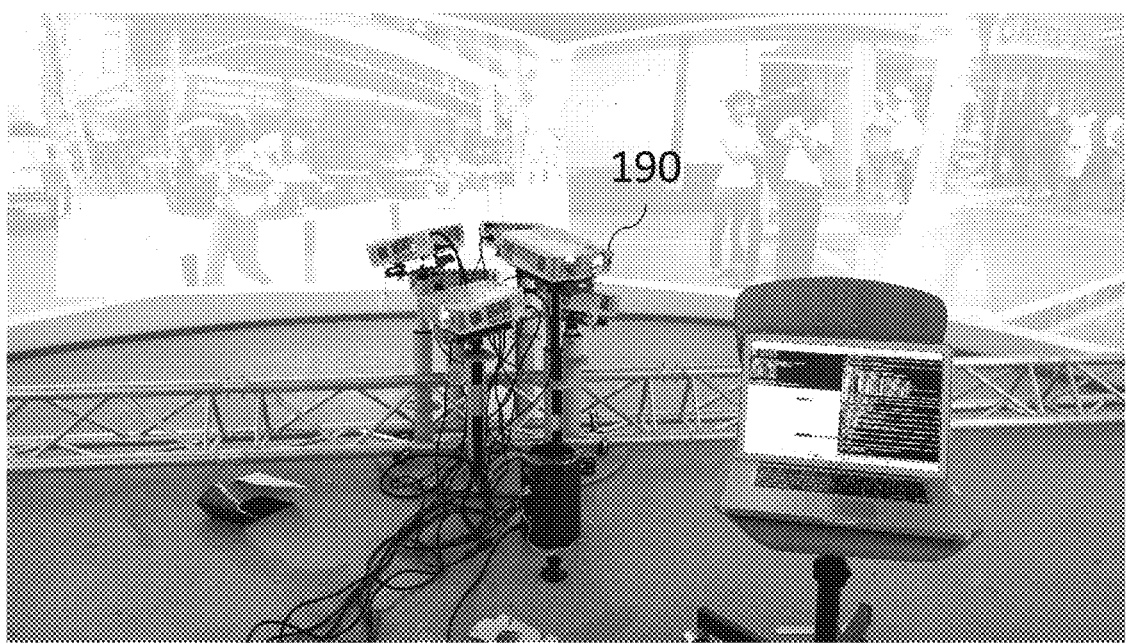
FIG. 4b shows a more detailed view of the video projection unit shown in FIG. 2.

FIG. 4a shows a projection of an image on the video projection surface on the inside of the immersive projection environment. The image is projected by the means of the video projection unit 190 comprised of several video projection devices whose individual images are overlapped in such a way as to fully cover the 360° circumference of the projection screen. In the embodiment shown in FIGS. 3A-3E, the video projection unit 190 is attached to a mount at the center of the cylinder's top, which can be suspended from the ceiling or a truss above the projection screen. FIG. 4b shows a more detailed view of the video projection unit 190.

In a preferred embodiment, the mount also holds a wireless network access point and the media server, providing the imagery for the projection unit.

Surround sound is provided by the audio projection unit, comprised of several loudspeakers arranged around the circumference of the screen, facing the center. The exact number of loudspeakers depends on the radius of the cylinder.

Figure 5A:
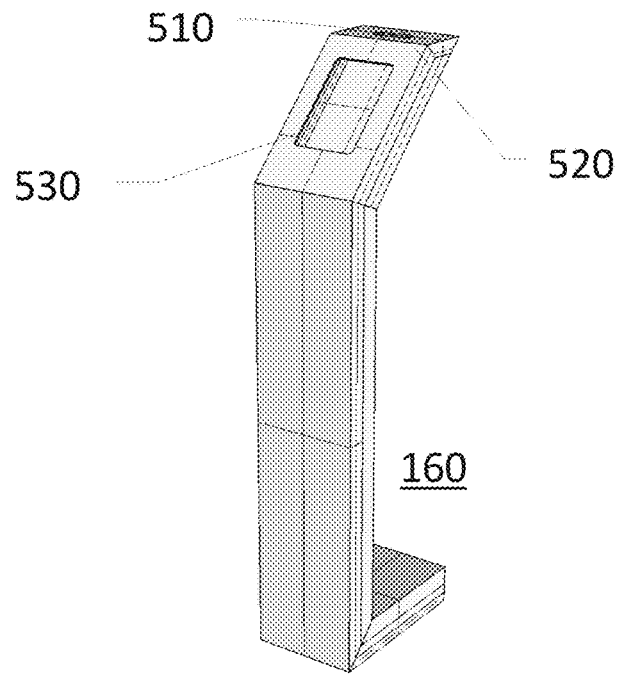
FIG. 5a shows a schematic drawing of an operator console 160 for navigating the content according to an embodiment of the invention.

FIG. 5a shows a schematic drawing of an operator console 160 for navigating the content. The console has the form of a column which accommodates a variety of controllers, including a gesture recognition controller 520, a 3-dimensional mouse, a trackpad, a microphone 510 for speech recognition as well as an auxiliary, touch sensitive display 530.

Figure 5B:
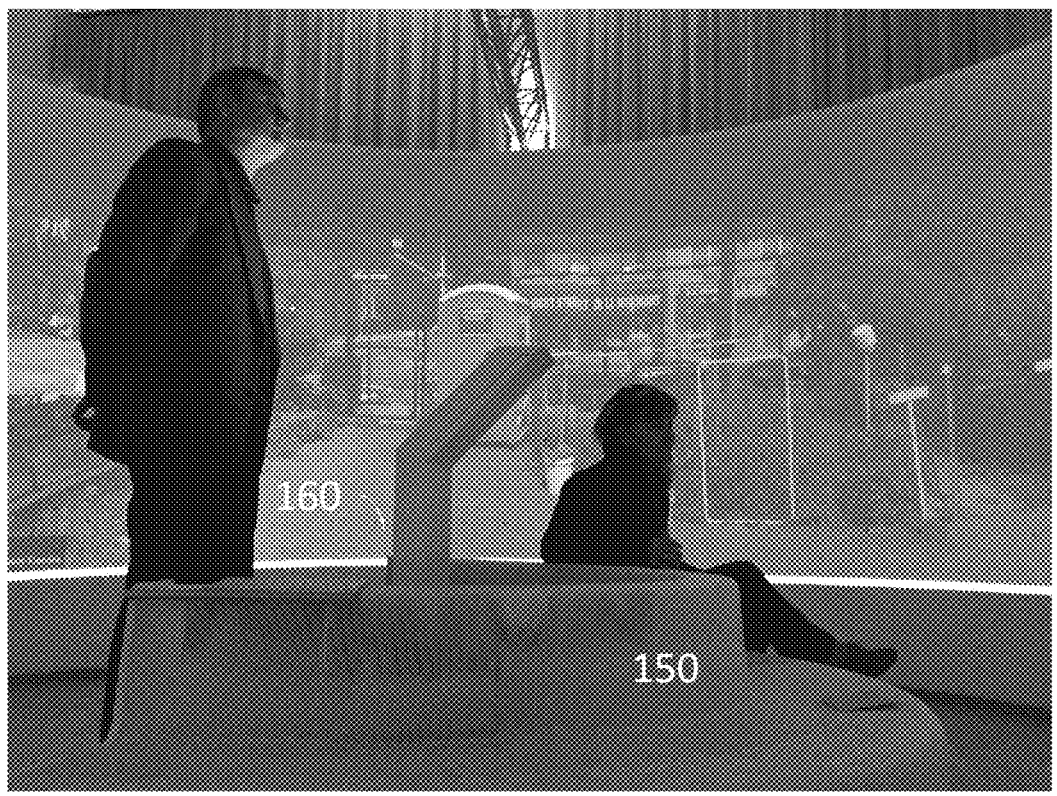
FIG. 5b shows an inside view of the prototype shown in FIG. 2, including the operator console and a bench.
Figure 5C:
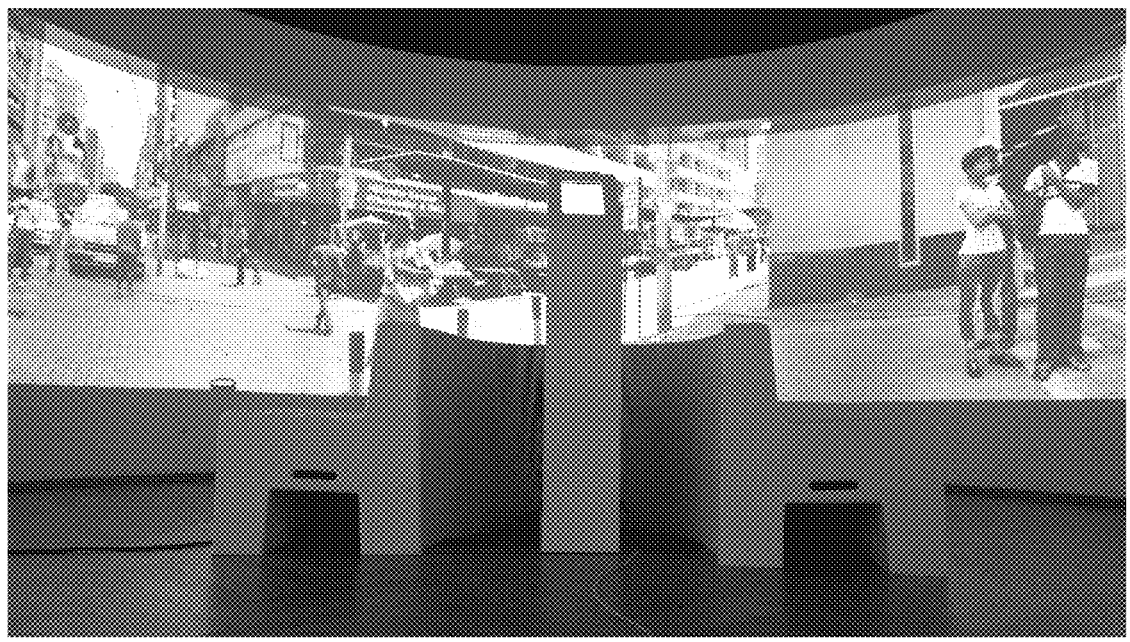
FIGS. 5c, 5d show further inside views of the prototype shown in FIG. 2, including the operator console and a bench.
Figure 5D:
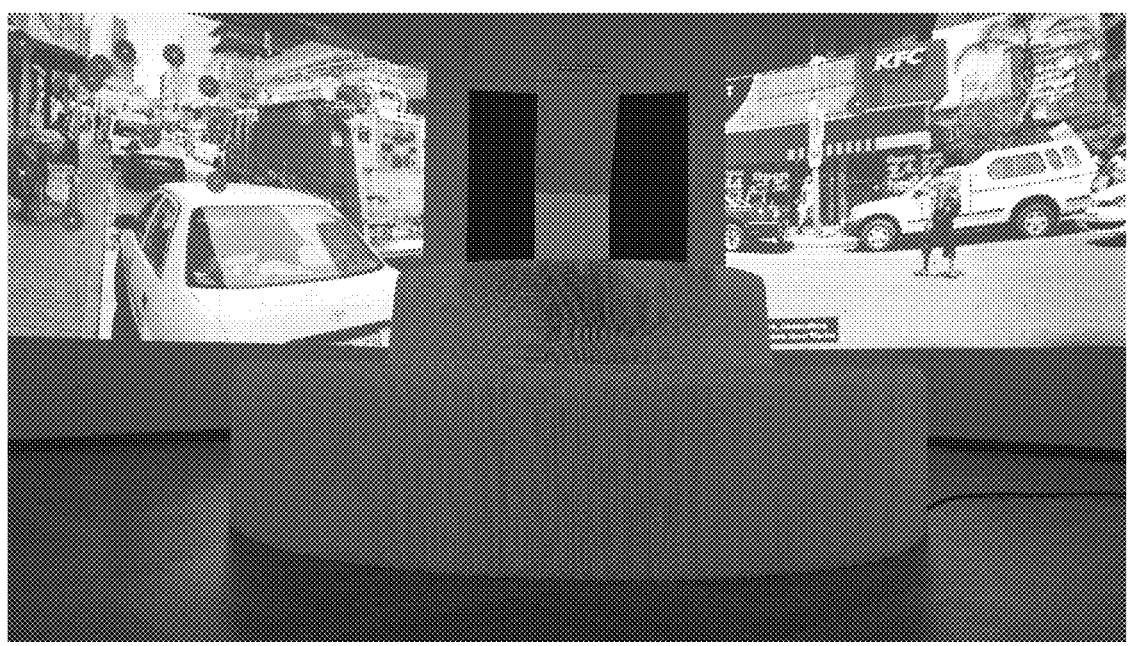

A flexible, extendable bench for the audience 150, shown in FIG. 5b, wraps around the operator console 160.

FIG. 6 shows a schematic overview of the software components 600 and their interaction in an interactive data visualization environment according to an embodiment of the invention, comprising a data collection application 610 for the clients; data aggregation infrastructure 630; media pre-processors 640; a scalable storage infrastructure and a database server 660; a communication queue 620; an authoring and editing application 650; a virtual research environment (VRE) as a frontend application 680; a projection environment for warping, edge-blending and color calibration 690; a virtual desktop application; an event queue 670; a speech recognition application; a gesture recognition application and an immersive companion application.

The data collection application 610 is a software running on the mobile clients. It makes use of the mobile client's capabilities to record audiovisual as well as textual or numerical data. The data is then augmented using the integrated sensors of the client device: GPS receiver and compass are used to determine the geographical positions and bearing of the device during recording, barometric pressure sensors are utilized to compute the altitude.

These additional readings along with the timestamp of the recording are added as metadata to the data. The user then has the option to annotate and comment on the specific details of the recording, after which the recording is scheduled for transmission to the data aggregation infrastructure 630 as soon as Internet connectivity is available.

The data collection application 610 can further receive and display messages and data collection requests sent by the project coordination team using the authoring and editing application 650 by means of the communication queue 620. The list of messages and requests is updated in regular intervals as soon as the device connects to the internet and can be acted upon by the user.

Data collected or created with the help of the distributed clients is transferred to the computing devices dedicated to the storage of raw data and indexed and categorized based on data type. For each data asset a globally unique identifier (GUID) as well as a database record, containing the state of that asset as well as metadata pertaining to it, is created. The database record will accompany the asset throughout its lifecycle. The asset is then renamed according to a standardized naming scheme and stored in its original form at the data storage.

An acknowledgement of reception and storage is broadcast to other components of the system via the communication queue 620, triggering further actions by the media pre-processing pipeline 640.

The media pre-processing pipeline 640 is a set of software tools for automated data extraction, refining and analysis as well as transcoding between data formats and production of sets of versions of data assets compatible with supported presentation platforms.

These include automated image, video and audio processing. In particular, this involves balancing audiovisual data along a common baseline of color models, audio volume, intrinsic camera properties such as lens distortion as well as creation of multiple versions of preview sequences or images for different platforms/bandwidth/display resolution scenarios.

Figure 7:
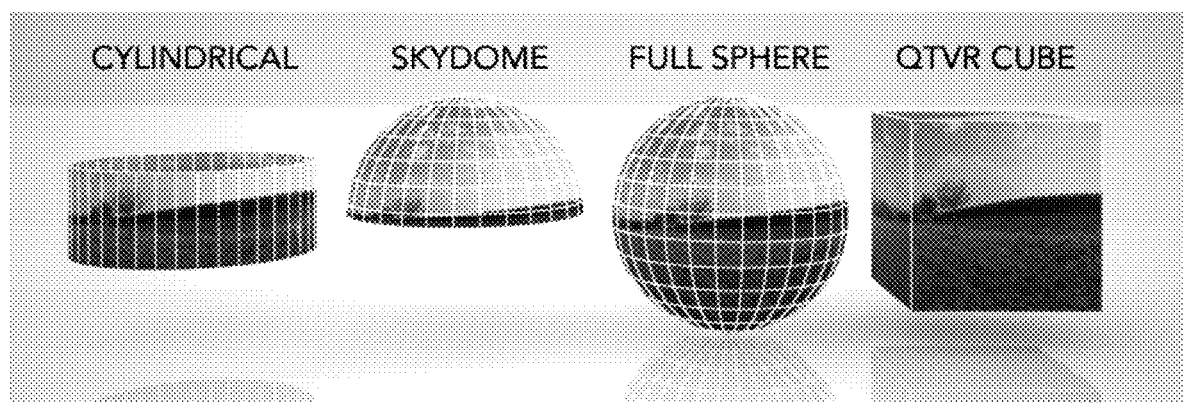
FIG. 7 shows a range of different projections that may be used to automatically create several versions of panoramic content.

FIG. 7 shows a range of different projections that may be used to automatically create several versions of panoramic content. In particular, a equirectangular projection or a cubic projection may be used for full spherical panoramic content or a rectilinear or a cylindrical projection may be used for panoramic content spanning a portion of the 360° vertical or horizontal field of view. Each panoramic asset is monitored in such a way that an update to one of its versions results in a complete recreation of all corresponding versions, incorporating the change.

Figure 8:
FIG. 8 shows an example of automatic text detection and recognition according to an embodiment of the invention.

FIG. 8 shows an example of automatic text detection and recognition according to an embodiment of the invention. Visual material is further processed with the aim of detecting and recognizing bodies of text on unstructured scenes. Unstructured scenes are images that contain undetermined or random scenarios. This involves the steps of detecting text region candidates and progressively removing those less likely to contain text; detecting candidate character regions with the help of maximally stable extremal regions (MSER)-algorithm; progressively removing non-text regions based on geometric properties by means of a combination of a rule-based and a machine learning approach using a text vs. non-text classifier. The rule-based approach may utilize several geometric properties for discriminating between text and non-text regions, such as aspect ratio, eccentricity, Euler number, extent, solidity. Further included is a step of removing non-text regions based on stroke width variation by estimating stroke width in detected MSER regions using distance transform and binary thinning operations. Measure variation of stroke width over the entire curve. Lines and curves with little variation over most of the region are likely to be text, since similar widths are a common characteristic of human readable text. Text regions are merged for final detection. Individual text characters should be merged to form text lines to increase recognition rate. In order to achieve this, individual bounding boxes around single characters are expanded and pair-wise overlap ratios for all bounding boxes are computed. Pairs with a non-zero overlap ratio are then merged into text regions by computing the minimum and maximum of the individual bounding boxes that make up each connected region. Bounding boxes with only one region are removed. To work around false detections, bounding boxes with isolated, single text regions are considered unlikely to be text and removed. After detecting text regions, text within each bounding box is recognized using OCR. At the same time, language of the detected text is recognized. The resulting texts are mapped on the 360° environment. Each resulting recognized text and its bounding box inherits the geographical position and bearing based on the exif data of the source photography. These are then projected on to the coordinate system of a sphere and can be further fine-tuned using the authoring and editing application 650. Detected text, bounding box size and position, detected language and confidence level of detection are then added to the assets database record for retrieval and display. Texts detected in photographs can then be displayed on an individual layer of an interactive data sphere.

The communication queue 620 is an application that enables communication with and coordination of remote teams, mandated with the task of data collection.

In the present embodiment, the application is based on the websocket protocol providing full-duplex communication channels over TCP. All messages in the communication queue are organized around locations designated for data collection. Each of these locations is assigned a separate message channel, which is updated with relevant state changes of the data storage 660, new assignments created in the authoring and editing application 650, as well as data collected by the team on site.

Each member of a remote data collection team has access to the communication queue 620 via the data collection application 610.

Coordinators of the project can access the communication queue 620 via the authoring and editing Application as well as utilize the IPE to receive updates on the progress.

The authoring and editing application 650 is a software that allows the user to compile collected data assets into interactive, immersive presentations (datascapes). The basic unit of these presentations are so-called dataspheres, comprising panoramic images or video recordings of the geographical location in question, which provide an immersive backdrop for the rest of the content, panoramic audio recordings of ambient sound of the location, audiovisual, quantitative or geographical records (assets) relevant or referring to specific location depicted on the backdrop or the location of the datasphere in general, arranged in clusters and oriented spatially as an overlay over the background. In a preferred embodiment of the invention, the dataspheres further comprise pre-configured API queries to various data sources, such as Twitter, Instagram, etc. in order to fetch real-time or historical data specific to the location of the datasphere, annotations, comments and metadata attached to specific records, additional information about the location of the datasphere, auxiliary texts and audiovisual recordings.

A datascape can consist of multiple dataspheres, which can either be presented as solitary environments or put into a spatial relationship to each other by creating links between them.

One or more users can move freely between linked dataspheres during a presentation. For this, a special affordance in form of an interactive element, which can be activated by any of the interaction controllers, is automatically created, once a link between dataspheres is established.

The position of this element on the backdrop is derived from the relative geographical direction of a target datasphere as seen from the source datasphere.

The user interface of the application consists of several views on different aspects of the data. A sphere view shows a preview of a single datasphere and allows the user to arrange data assets in layers, adjust parameters and settings of an individual datasphere and to record guided tours. A list of assets provides an overview of all data available at the data storage. The user can view and edit annotations and comments, tag assets with specific keywords and manage multilingual versions of assets. A communication pane provides a comprehensive list of messages from remote teams in the field and allows to create work assignments to these as well as to individual team members. An analytics view provides the user with visualizations of user engagement and allows to fine-tune and improve user experience and narrative of presentations. Users can create dataspheres by selecting a panoramic backdrop from a list of available material. Other available assets can then be added automatically based on their geographical location, or manually by the user. Assets can be grouped into clusters which can then be arranged on the backdrop. Each asset can be annotated or tagged with specific keywords, comments and additional texts. Users can further adjust parameters, according to which the assets may become visible or hidden, for example time of day, specific keywords or different language settings. Users can also mark certain areas (hotspots) on the backdrop and highlight these for further research or designate them as targets for upcoming data collection efforts. Further comments can be attached to these hotspots and are passed on by the application to the communication queue. The user can select and add audio recordings of ambient sounds, define the order in which these recordings will be played back. Binaural or surround sound recordings can be adjusted in their orientation relative to the geographical bearings of the datasphere.

Figure 9:
FIG. 9 is a map view showing all available dataspheres at their geographic locations and allowing the user to add or remove spheres, relocate them to new coordinates on the map or create links between spheres via drag-and-drop.

FIG. 9 is a map view showing all available dataspheres at their geographic locations and allowing the user to add or remove spheres, relocate them to new coordinates on the map or create links between spheres via drag-and-drop. Alternatively, if a completely new datasphere is required, a location on a map can be designated as a new (empty) datasphere and assigned to a team of remote colleagues for data collection.

After the dataspheres are defined, linked and compiled into datascapes, the user can record and edit guided tours through datascapes. These can include the whole range of interaction possibilities such as activation of interactive elements, performing search queries and jumping between different locations as well as actions not available to the audience, such as display of content overlays with auxiliary information. These interactions can be scripted to take place after certain conditions are fulfilled, for example at a certain time of day or after a certain period of time without user input. Created scripts can be edited via a graphical interface, where individual actions can be added, reordered, modified or deleted. At any stage the datascapes can be finalized and exported or published online for use in VR-HMDs or the Immersive Presentation Environment.

After presentations, the user can view aggregated logs of user interaction within each datasphere, visualized in form of a heat map.

Preprocessed media assets such as video and audio recordings are saved on a scalable object storage platform 660. Each asset is assigned a globally unique identifier (GUID) and a database record with the GUID as a key. The record also contains a URL of the binary asset. The structure of the database has a form of a graph, with geographical locations of individual dataspheres serving as root nodes and all other assets and data records arranged as a tree in relation to this node. Data assets can be compiled into clusters manually or automatically, based on geographical distance from each other and/or relevance to a specific location or another data point. Data records also include metadata of collected assets, such as EXIF parameters, altitude, automatically detected bodies of text and their positions, as well as annotations and comments relevant to these.

The virtual research environment 680 is an application that enables users to traverse the datascapes and interact with the data presented in individual spheres. It connects to the Application Server by means of a wired or wireless network and visualizes the presentations compiled with the help of the Authoring and Editing Application by means of an IPE or VR-HMDs. The user is either presented with a starting location or with a possibility to choose a starting location from a list. When a current location is selected from a list or by triggering a location change from another datasphere, the VRE queries the data graph corresponding to the new geographical location and prepares all data in the resulting subgraph for display. At this point, processes relevant to watching real-time data streams are set up and connected to the event queue.

Figure 10A:
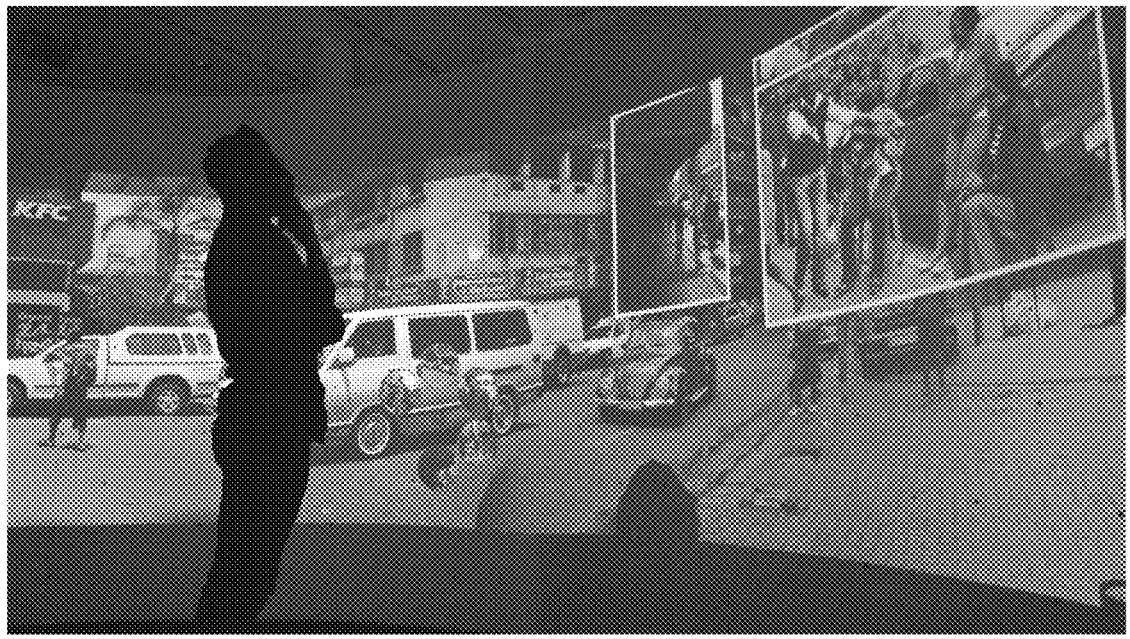
FIG. 10a shows an example of how the immersive audiovisual content is presented to the user, along with data corresponding to the current sphere.

FIG. 10*a* shows an example of how the immersive audiovisual content is presented to the user, along with data corresponding to the current sphere. The data is presented by means of multiple layers, with the base layer reserved for the panoramic backdrop visuals and the rest of the data overlaid on top. Depending on data type, special layers for different kinds of data can be defined, allowing for instance overlay of historical imagery or statistics, combining several time domains or categories of data to be presented simultaneously. The topmost layer is reserved for interface elements and system messages. Data clusters are presented to the user as interactive elements that can be activated ("opened") by means of supported interaction devices. Once activated, a selection menu with all data points in the cluster is revealed at the former position of the interactive elements. The menu presents available assets as scaled-down preview images and video loops. Subsequently, the user has the option to explore individual assets of the current cluster or return to the main level. Special interactive elements represent links between dataspheres. When activated by the operator they notify the event queue about the imminent location change.

The event queue 670 is an application with the main purpose of synchronizing state across the backend, the VRE as well as companion applications and enables the system to react to input from gesture and speech controllers and other input devices. It further notifies the system about updates to the data structure Similar to the communication queue 629 it is based on the web sockets messaging protocol and provides multiple channels that can be subscribed to by a range of applications. After subscription to a channel the connected client can send messages which are queued into the channel and made available to all subscribed application. Messages consist of a time stamp of its creation, message type and a variable, application-specific, alphanumerical or binary payload.

Figure 10B:
FIG. 10b shows an example of a user interacting with the systems by means of a gesture.

FIG. 10*b* shows an example of a user interacting with the systems by means of a gesture. A gesture controller sends messages to the queue, notifying the system of a recognized gesture. The messages are then sorted into the "gestures" channel and rebroadcast to the event controller of the VRE, which in turn activates a corresponding function, e.g. allowing the user to change the scale factor of the panoramic backdrop by moving the hand along a spatial axis. More particularly, a gesture recognition application receives a constant stream of state updates from the gesture input controller. These contain position and spatial orientation of user's hands and fingers relative to the controller. Based on these, the application is then able to calculate the position and orientation of the hand relative to the physical screen and project the computed vector in to the coordinate system of the VRE 680. The updated projected position of the hand as well as recognized gestures formed by the users fingers are then sent to the event queue 670 and can be acted upon by the VRE 680. For example, gestures can be used for zooming the presentation or to select and control the volume of a particular audio source.

A speech recognition application receives voice input from the speech recognition controller and after processing, it returns user intent in form of predefined tokens to the voice input channel on the event queue. The VRE watches the voice input channel and performs the actions specified in the user intent.

The immersive companion application allows the visitors of an IPE to gain permanent access to specific parts of the presentation's content, even after they have left the presentation environment. This is achieved by scanning a special optical label which, when decoded by the application, contains a special link to a datasphere, an asset cluster or individual assets. These are added to a list of available content and allow the user to revisit parts of the presentation at will.

The virtual desktop application emulates a virtual display with an adaptable graphics resolution, spanning several physical displays or video projectors. The application allows the system to interact with multiple displays as if these were parts of a single seamless panel. It splits the final output image and renders individual segments using connected display devices according to a previously defined mapping scheme.

Integrating several projectors into a single display leads to the problem of achieving a pixel-perfect alignment and seamless tiling of individual projections. To work around the resulting imperfections, images of adjacent projectors are arranged in such a way that these overlap by a significant amount and the effects of overlapping projections are countered at the image post-processing stage, prior to the output of the rendered images to the physical devices. Multiple overlapping projections from individual projection devices result in areas of varying luminosity, whereas the curved geometry of a cylindrical or spherical screen leads to distortions of projected images. In order to achieve a seamless and undistorted projection, several transformations are applied to the graphical data.

Figure 11:
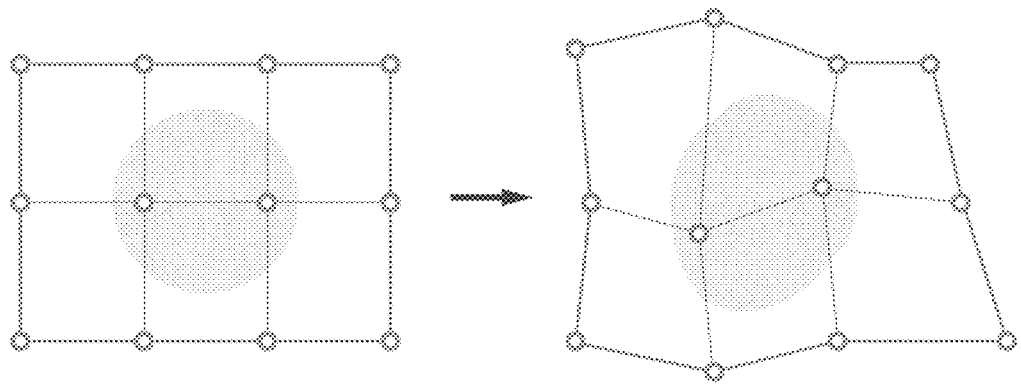
FIG. 11 shows an example of a grid distortion used according to an embodiment of the invention.

FIG. 11 shows an example of a grid distortion used according to an embodiment of the invention. Each segment of the virtual desktop, corresponding to a single physical device is extended to include portions of adjacent display segments and then transformed according to a previously configured distortion grid, mapping each vertex of the original grid to a corresponding location on the target grid.

Figure 12A:
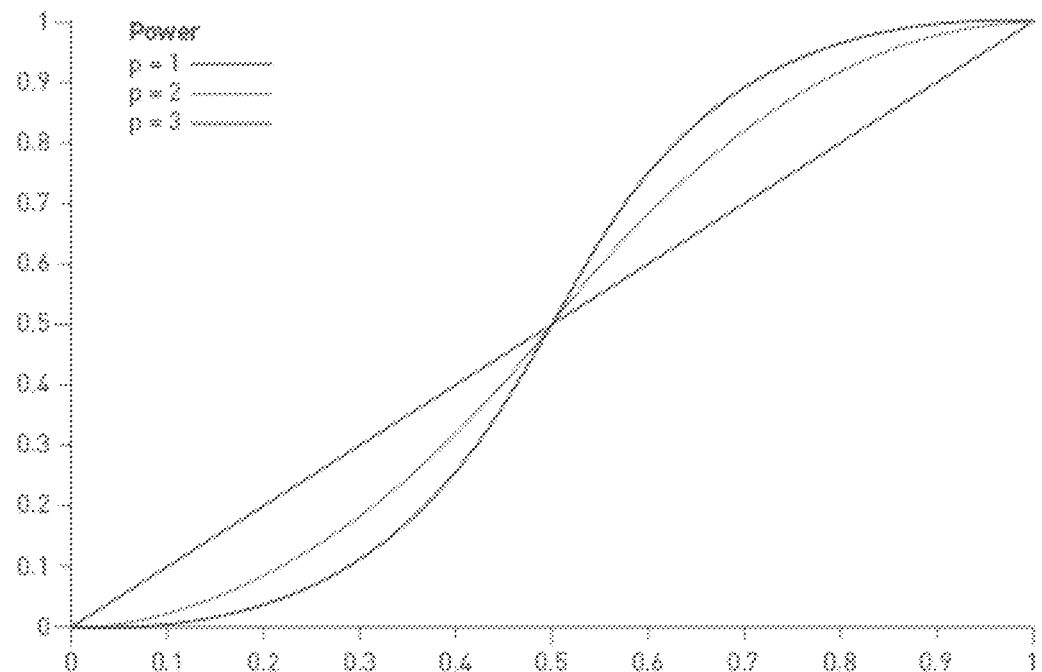
FIG. 12a shows different edge-blending functions according to an embodiment of the invention.
Figure 12B:
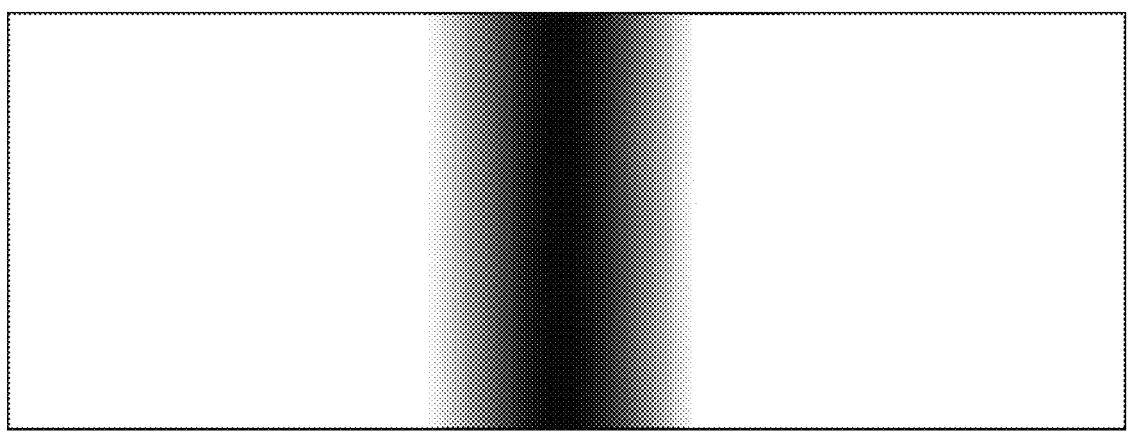

FIG. 12a shows different edge-blending functions according to an embodiment of the invention. Higher luminosity of overlapping regions is countered by multiplying each pixel in the overlapping region of one projector by such an amount (x) that when it is added to the corresponding pixel displayed by the second projector, the result has the luminosity similar to pixels of same value in the non-overlapping parts. The value of x is determined using a blend function, which is adapted individually for each pair of devices. FIG. 12b shows an edge-blending mask for luminosity adjustment between individual projection devices corresponding to an edge blending function of FIG. 12a.

A similar approach is applied to ensure a perceptional seamless color reproduction of video projectors—since even projectors of the same model can have visible variation in the way different colors are rendered, a calibration profile, providing a function for modifying the value of pixels for each color channel is applied to each segment of the virtual desktop prior to output.

I claim:

1. An immersive environment for data exploration, comprising:
   a curved video projection surface, the surface comprising a multitude of video projection modules; and
   a video projection unit for projecting imagery onto the curved video projection surface,
   characterized in that,
   the video projection modules are self-supporting,
   wherein the video projection surface is at least partially translucent or comprises at least one partially translucent video projection module,
   wherein imagery projected by the video projection unit onto inside of the curved video projection surface and silhouettes of people inside the immersive environment are observable through the video projection surface from outside the video projection surface, and
   wherein the video projection modules are thermoformed, and
   wherein the video projection modules are made of a solid, homogeneous surfacing material, composed of ≈⅓ acrylic resin and ≈⅔ natural minerals.

2. The environment according to claim 1, wherein the projection surface has the form of an upright, open cylinder.

3. The environment according to claim 1, wherein the video projection unit comprises a multitude of video projection devices, whose individual images are overlapped in such a way as to cover the curved video projection surface.

4. The environment according to claim 3, where the environment has the form of a cylinder, and wherein the video projection unit is attached to a mount, at a center of the environment's top.

5. The environment according to claim 4, wherein the mount further comprises a wireless network access point and/or a media server.

6. The environment according to claim 4, wherein an operator console is located at a center of the environment.

7. The environment according to claim 6, wherein a bench for accommodating a user wraps around the operator console.

8. The environment of claim 1, wherein the video projection surface is translucent or comprises at least one translucent video projection module.

9. A video projection module for use in an immersive environment for data exploration,
   wherein the video projection module is at least partially translucent and has a curved surface, wherein imagery projected inside the curved surface and silhouettes of people inside the immersive environment are visible outside the immersive environment and through the video projection module, characterized in that,
   the video projection module is self-supporting, and
   wherein the video projection module comprises a solid, homogeneous surfacing material, composed of ≈⅓ acrylic resin and ≈⅔ natural minerals.

10. The video projection module of claim 9, wherein the video projection module is translucent.

\* \* \* \* \*